United States Patent
Ziegler et al.

(10) Patent No.: US 7,160,959 B2
(45) Date of Patent: Jan. 9, 2007

(54) POLYMER ADDITIVES FOR POWDER COATINGS

(75) Inventors: Michael J. Ziegler, Cranberry Township, PA (US); William H. Retsch, Jr., Castle Shannon, PA (US); Anthony M. Chasser, Allison Park, PA (US); Ronald R. Ambrose, Pittsburgh, PA (US); Jackie L. Kulfan, Mars, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 348 days.

(21) Appl. No.: 10/804,685

(22) Filed: Mar. 19, 2004

(65) Prior Publication Data

US 2005/0209402 A1    Sep. 22, 2005

(51) Int. Cl.
*C08F 8/16* (2006.01)

(52) U.S. Cl. ........................... 525/386; 524/904

(58) Field of Classification Search .................. None
See application file for complete search history.

(56) References Cited

U.S. PATENT DOCUMENTS

| | | | |
|---|---|---|---|
| 3,892,714 A | 7/1975 | Sampson et al. | 260/77.5 CR |
| 4,504,635 A | 3/1985 | Weber, Jr. et al. | 525/450 |
| 4,916,254 A * | 4/1990 | Watanabe et al. | 560/185 |
| 4,981,921 A | 1/1991 | Blum et al. | 525/419 |
| 4,988,763 A * | 1/1991 | Kessler et al. | 525/61 |
| 5,082,922 A * | 1/1992 | Brandenburger et al. | 528/323 |
| 5,506,320 A | 4/1996 | Yu | 526/266 |
| 5,663,260 A | 9/1997 | Frechet et al. | 526/292.9 |
| 6,333,367 B1 | 12/2001 | Kato et al. | 523/409 |
| 2001/0014728 A1 | 8/2001 | Aoki et al. | |
| 2003/0171473 A1 * | 9/2003 | Sawada et al. | 524/394 |
| 2005/0154076 A1 * | 7/2005 | Bach et al. | 522/8 |

FOREIGN PATENT DOCUMENTS

| | | |
|---|---|---|
| EP | 0473088 | 1/1998 |
| EP | 0 838 506 | 4/1998 |
| JP | 54-125232 A * | 9/1979 |

OTHER PUBLICATIONS

Patent Abstracts of Japan, JP 2002167490, Jun. 2002 entitled "Hardening Resin Composition Composed of Acrylic Polyol Resin and Melamine Resin", Okazaki Akira.
Patent Abstracts of Japan, JP 2002167422, Jun. 2002 entitled "Isocyanate Curable Coating Material Composition Using Low-Lactone Modified Hydroxyalkyl(Meth)Acrylic Ester Composition", Okazaki Akira.
Patent Abstracts of Japan, JP 2003313493, Nov. 2003 entitled "Top-Coating Composition, Finish-Coating Method, and Finish-Coated Article", Takemoto Masayuki.
Patent Abstracts of Japan, JP 2000327995, Nov. 2000 entitled "Coating Composition", Ueda Takeharu.
Patent Abstracts of Japan, JP 11001637, Apr. 1999, entitled "Resin Composition for Powder Coating Material", Kusakabe Masato.
Patent Abstracts of Japan, JP 54125232, Sep. 1979 entitled "Resin Composition for Powder Coating", Arimoto Shunji.

* cited by examiner

*Primary Examiner*—Marc S. Zimmer
(74) *Attorney, Agent, or Firm*—Diane R. Meyers; Donald R. Palladino

(57) ABSTRACT

Comb polymers prepared by reacting an acrylic polyol or a siloxane polyol with a lactone are disclosed. These comb polymers find particular application as additives for powder coating compositions, to improve various performance properties thereof. Powder coating composition comprising the described comb polymers are also disclosed.

15 Claims, No Drawings

POLYMER ADDITIVES FOR POWDER COATINGS

FIELD OF THE INVENTION

The present invention relates to powder coatings comprising a polymer additive. More specifically, the polymer additive comprises a polyol to which is grafted linear moieties comprising lactone.

BACKGROUND INFORMATION

In recent years, powder coatings have become increasingly popular; because these coatings are inherently low in volatile organic content (VOC), their use significantly reduces air emissions during the application and curing processes. Powder coatings are typically cured by heating the coated substrate to an elevated temperature, such as higher than 125° C. During the curing process, the powder particles melt and spread, and the components of the powder coating react.

Powder coatings used today can be classified broadly in two distinct categories, ultraviolet durable and ultraviolet non-durable. Often, the durable powder compositions are brittle and the non-durable films, while flexible, may not give the desired durability. There is a need in the marketplace to have powder coatings that give flexible and durable films when cured. Such coatings would have widespread application, such as in high impact areas or environments requiring secondary post-forming stages, something that is not currently possible. In addition, good flow, leveling and/or handling of the powder is desired.

SUMMARY OF THE INVENTION

The present invention is generally directed to powder coatings comprising a film-forming resin, a crosslinker, and polymers that are the reaction product of a polyol and a lactone. The polyol is typically ether an acrylic polyol or a siloxane polyol, and is generally linear with one or more pendant hydroxyl groups. One or more of these hydroxyl groups are reacted with lactone, as described below.

The powder coatings of the present invention will often demonstrate increased flexibility and may have increased toughness; the present powder coatings also may have improved flow and leveling characteristics and decreased gassing as compared with powder coatings lacking the polymer additives described herein.

DETAILED DESCRIPTION OF THE INVENTION

The present invention is directed to powder coating compositions that comprise a film-forming resin, a crosslinker, and a polymer additive. Use of one or more film-forming resins, crosslinkers and/or polymer additives are within the scope of the present invention. The polymer additive comprises the reaction product of a linear polyol having pendant hydroxyl groups and a lactone. The reaction product of the linear polyol and the lactone is sometimes referred to herein as the "comb polymer". In one embodiment of the present invention, the polyol is an acrylic polyol and in another embodiment the polyol is a siloxane polyol.

The polyols used herein are ungelled polyols comprised of monomers, wherein at least one of the monomers provides a pendant hydroxyl group to the polymer. The polyol can be, for example, an acrylic polyol having pendant hydroxyl groups attached to the acrylic backbone through some means, such as an ester linkage. Acrylic polyol" can refer to an acrylic polymer with a degree of polymerization greater than 5 and an average functionality greater than 2. Such polyols are commercially available from Johnson Polymer as "hydroxyl acrylics" in their JONCRYL line. Acrylic polyols can be prepared through normal free radical polymerization procedures of acrylate monomers using standard techniques. Suitable monomers for use in preparing the acrylic polyol include ethylenically unsaturated monomers such as hydroxyethyl(meth)acrylate, hydroxypropyl(meth)acrylate, hydroxybutyl(meth)acrylate, methyl(meth)acrylate, ethyl(meth)acrylate, butyl(meth)acrylate, 2-ethylhexyl(meth)acrylate, (meth)acrylic acid, vinyl aromatic compounds such as styrene, para-hydroxy styrene and vinyl toluene, nitriles such as (meth)acrylonitrile, and vinyl esters such as vinyl acetate. Any other acrylic monomers known to those skilled in the art could also be used. The term "(meth)acrylate" and like terms are used conventionally and herein to refer to both methacrylate and acrylate. Two or more monomers can be used; at least one polymer should be selected so as to provide the acrylic polyol with one or more pendant hydroxyl groups. Hydroxyethyl methacrylate ("HEMA") is particularly suitable for this purpose.

The acrylic polyols used herein will typically have weight average molecular weights of 500 to 200,000, such as 5,000 to 80,000 or 12,000 to 50,000, as determined by gel permeation chromatography using linear polystyrene standards. The hydroxy value of these polyols can range from 5 to 200, such as 30 to 100.

Alternatively, the polyol can be a siloxane polyol. A "siloxane polyol", as that term is used herein, refers to organic/inorganic hybrid oligomers containing siloxane segments, carbon-silicon bonds and organic segments terminated with hydroxy groups. Such polyols are commercially available from Dow Corning as Z-6018. Alternatively, the siloxane polyols can be prepared by hydrosilation of allyl glycol ethers with silicon hydrides. U.S. Pat. No. 6,387,519, incorporated by reference herein, describes suitable siloxane polyols such as those depicted as Formulas II, III or VI, wherein one or more of the "$R^a$" groups are hydroxyl/alkyl groups.

The siloxane polyols used according to the present invention will typically have a number average molecular weight of about 500 to 5000, such as 750 to 3000, as determined by gel permeation chromatography. The hydroxy value of these polyols can range from 50 to 500, such as 100 to 300.

The polyol having pendant hydroxyl groups is then further reacted with a lactone. The lactone can be substituted or unsubstituted. It will be appreciated that lactides are specific lactones and are within the present invention. Particularly suitable lactones are epsilon-caprolactones, such as methyl epsilon-caprolactone, a mixture of isomeric methyl caprolactones or a mixture of isomeric methyl epsilon-caprolactones with epsilon-caprolactone. Other examples include but are not limited to octanoic lactones, butyrolactones, valerolactones, gluconolactones, oxycyclotridecane-2-ones, and pentadeca-lactones.

The lactone is attached or grafted to the polyol through the ring opening polymerization of the lactone initiated by the hydroxyl functional group(s) of the polyol. The results of the grafting is the "comb polymer" according to the present invention. The grafting step is accomplished by charging the lactone to the reaction vessel and heating the mixture to a temperature suitable for the ring opening reaction, typically 80 to 250° C. An additional catalyst can also be added. As a result of the grafting procedure, between 1 and 100 percent of the hydroxyl functional groups on the polyol will have a linear polymer chain comprised of at least one lactone molecule attached thereto. Typically, the large majority (i.e. greater than 70 percent, such as greater than 90 percent or 95 percent or greater) of the groups will be reacted. The linear polymer chains comprised of at least one lactone molecule that become attached will have a terminal hydroxyl group. Thus, the comb polymer itself also has hydroxyl functionality. Using a large excess of lactone can force the grafting to occur at ~100% of the hydroxyl groups on the polyol. A 5 to 50 fold excess of lactone to hydroxyl functional groups can be used, as can about a 20 fold excess. It will be understood by those skilled in the art that there are other ways to graft the lactone moieties to the backbone polymer, all of which are within the scope of the present invention.

The reaction between the hydroxyl group(s) on the polyol with the lactone will result in opening of the lactone ring in the normal manner to produce a hydroxyl terminated lactone, the other end of which will be attached to the polyol. The hydroxyl terminated lactone chain may react with further lactone molecules to produce a hydroxyl terminated polylactone side chain. A "lactone chain" therefore refers to a hydroxyl terminated side chain that results from "ring opening" the lactone; a lactone chain according to the present invention can contain one or more lactone-derived units. In determining the ratio of lactone to polyol to use, consideration should be given to the amount of lactone needed to give the desired average lactone chain length. Generally, the lactone chain length may be increased indefinitely. Typically, the lactone does not merely polymerize on to a few hydroxyl groups of the polyol to produce several long lactone chains but rather the lactone molecules are distributed among a large number of hydroxyls. As noted above, typically greater than 70 percent, such as greater than 90 percent or even 95 percent or greater of the hydroxyl functional groups of the polyol have a lactone chain attached thereto, although the invention is not so limited. The amount of lactone added (expressed as a weight percentage of the total weight of the comb polymer—both polyol and lactone side-chains) is typically from 10 to 95 percent, such as 65 to 95 percent. Lactone chains comprised of 2 to 50 lactone units are particularly suitable for use in powder coatings.

The weight average molecular weight of the comb polymer of the present invention will typically be about 5,000 to about 500,000, such about 25,000 to 250,000, as determined by gel permeation chromatography using linear polystyrene standards. These comb polymers are also characterized in certain embodiments by melting temperatures in the range of about 40 to about 65° C.

In addition to one or more of the comb polymers described above, the present powder coatings further comprise a film-forming resin. Any resin that forms a film can be used according to the present invention, absent compatibility problems. A particularly suitable resin for use in the present powder compositions is one formed from the reaction of a polymer having at least one type of reactive functional group and a curing agent having functional groups reactive with the functional group of the polymer. The polymers can be, for example, acrylic, polyester, polyether or polyurethane, and can contain functional groups such as hydroxyl, carboxylic acid, carbamate, isocyanate, epoxy, amide and carboxylate functional groups.

The use in powder coatings of acrylic, polyester, polyether and polyurethane polymers having hydroxyl functionality is known in the art. Monomers for the synthesis of such polymers are typically chosen so that the resulting polymers have a glass transition temperature ("Tg") greater than 50° C. Examples of such polymers are described in U.S. Pat. No. 5,646,228 at column 5, line 1 to column 8, line 7, incorporated by reference herein.

Acrylic polymers and polyester polymers having carboxylic acid functionality are also suitable for powder coatings. Monomers for the synthesis of acrylic polymers having carboxylic acid functionality are typically chosen such that the resulting acrylic polymer has a Tg greater than 40° C., and for the synthesis of the polyester polymers having carboxylic acid functionality such that the resulting polyester polymer has a Tg greater than 50° C. Examples of carboxylic acid group-containing acrylic polymers are described in U.S. Pat. No. 5,214,101 at column 2, line 59 to column 3, line 23, incorporated by reference herein. Examples of carboxylic acid group-containing polyester polymers are described in U.S. Pat. No. 4,801,680 at column 5, lines 38 to 65, incorporated by reference herein.

The carboxylic acid group-containing acrylic polymers can further contain a second carboxylic acid group-containing material selected from the class of C4 to C20 aliphatic dicarboxylic acids, polymeric polyanhydrides, low molecular weight polyesters having an acid equivalent weight from about 150 to about 750, and mixtures thereof. This material is crystalline and is preferably a low molecular weight crystalline or glassy carboxylic acid group-containing polyester.

Also useful in the present powder coating compositions are acrylic, polyester and polyurethane polymers containing carbamate functional groups. Examples are described in WO Publication No. 94/10213, incorporated by reference herein. Monomers for the synthesis of such polymers are typically chosen so that the resulting polymer has a high Tg, that is, a Tg greater than 40° C. The Tg of the polymers described above can be determined by differential scanning calorimetry (DSC).

Suitable curing agents generally include blocked isocyanates, polyepoxides, polyacids, polyols, anhydrides, polyamines, aminoplasts and phenoplasts. The appropriate curing agent can be selected by one skilled in the art depending on the polymer used. For example, blocked isocyanates are suitable curing agents for hydroxy and primary and/or secondary amino group-containing materials. Examples of blocked isocyanates are those described in U.S. Pat. No. 4,988,793, column 3, lines 1 to 36, incorporated by reference herein. Polyepoxides suitable for use as curing agents for COOH functional group-containing materials are described in U.S. Pat. No. 4,681,811 at column 5, lines 33 to 58, incorporated by reference herein. Polyacids as curing agents for epoxy functional group-containing materials are described in U.S. Pat. No. 4,681,811 at column 6, line 45 to column 9, line 54, incorporated by reference herein. Polyols, materials having an average of two or more hydroxyl groups per molecule, can be used as curing agents for NCO functional group-containing materials and anhydrides, and are well known in the art. Polyols for use in the present invention are typically selected such that the resultant material has a Tg greater than about 30° C.

Anhydrides as curing agents for epoxy functional group-containing materials include, for example, trimellitic anhydride, benzophenone tetracarboxylic dianhydride, pyromellitic dianhydride, tetrahydrophthalic anhydride, and the like as described in U.S. Pat. No. 5,472,649 at column 4, lines 49 to 52, incorporated by reference herein. Aminoplasts as curing agents for hydroxy, COOH and carbamate functional group-containing materials are well known in the art. Examples of such curing agents include aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

The film-forming resin described above is generally present in the powder coatings of the invention in an amount greater than about 50 weight percent, such as greater than about 60 weight percent, and less than or equal to 95 weight percent, with weight percent being based on the total weight of the composition. For example, the weight percent of resin can be between 50 and 95 weight percent. When a curing agent is used, it is generally present in an amount of up to 30 weight percent; this weight percent is also based on the total weight of the coating composition.

It will be appreciated that the hydroxyl functionality that results from the lactone addition may react with one or more of the other components of the powder coating composition. For example, if the comb polymer has hydroxyl functionality at the end of a lactone chain, a blocked isocyanate crosslinker and a hydroxy functional film-forming resin can be used.

It is also possible, according to the present invention, to modify the functionality that is present on the comb polymer. For example, the hydroxy functionality that results from lactone grafting can be converted to an acidic functionality, by reacting the hydroxy, for example, with a cyclic carboxylic acid anhydride. This reaction can be carried out by charging the hydroxy functional comb polymer to the reaction vessel and heating the mixture to a temperature suitable for the ring opening of the cyclic anhydride, such as 80 to 150° C. In this manner, the hydroxy functional comb polymer is converted to an acidic functional comb polymer. This conversion may be relevant in a system wherein a curing agent that is reactive with a carboxylic acid functional group is desired rather than a curing agent that is reactive toward a hydroxy functional group, such as in a system using triglycidyl isocyanurate. Other moieties as desired by the user could also be introduced through reaction with the terminal hydroxy on the comb polymer.

The polymer additive of the present invention is typically present in the curable powder coating composition in an amount ranging from 0.1 to 20 weight percent, such as 1 to 10 weight percent, or about 5 weight percent, with weight percent based on total weight of the coating composition; in one embodiment, the weight percent is less than 20 weight percent. In one embodiment wherein the polyol is acrylic polyol, the weight percent of polymer additive is less than 10 weight percent of the total powder composition, such as less than 10 weight percent to 0.1 weight percent. As used herein, "curable coating composition", "cured coating composition" and like terms will be understood as referring to a composition in which the components react with each other so as to resist melting upon heating. It will be appreciated that inclusion of the present additives or comb polymers in the powder coatings of the present invention will result in at least one improvement to the performance characteristics of the present powder coatings, such as improved flow and/or improved leveling, decreased gassing, increased flexibility, and/or improved appearance. Even slight improvements in any of these characteristics is deemed an improvement according to the present invention. In some embodiments, dramatic improvement to impact resistance is seen with even slight additions of these comb polymers. Moreover, gloss can be more easily varied with the coatings of the present invention. It will be further appreciated that the polymer additives or comb polymers used in the powder coatings of the present invention are used in additive quantities. That is, they are in quantities sufficient to form a film themselves; an additional quantity of a separate film-forming resin should be used in sufficient quantity to form a film. Thus, the "film-forming resin" as used herein does not refer to the comb polymer.

The powder coating compositions of the present invention may optionally contain other additives such as waxes for flow and wetting, flow control agents, such as poly(2-ethylhexyl)acrylate, degassing additives such as benzoin and MicroWax C, adjuvant resin to modify and optimize coating properties, antioxidants, ultraviolet (UV) light absorbers and catalysts. Examples of useful antioxidants and UV light absorbers include those available commercially from Ciba Specialty Chemicals Corporation under the trademarks IRGANOX and TINUVIN. These optional additives, when used, can be present in amounts up to 20 percent by weight, based on total weight of the coating.

The compounds of the present invention, as well as any additional additives, can be added at any time during the formulation of the powder coating. For example, curable powder coating compositions of the present invention can be prepared by first dry blending the film-forming resin, and any of the additives described above including the present compounds, in a blender, such as a Henschel blade blender. The blender is operated for a period of time sufficient to result in a homogenous dry blend of the materials. The blend is then melt blended in an extruder, such as a twin screw co-rotating extruder, operated within a temperature range sufficient to melt but not gel the components. The melt blended curable powder coating composition is typically milled to an average particle size of from, for example, 15 to 80 microns. Other methods known in the art for preparing powder coatings can also be used.

The powder coating compositions are most often applied by spraying, and in the case of a metal substrate, by electrostatic spraying, or by the use of a fluidized bed. The powder coating can be applied in a single sweep or in several passes to provide a film having a thickness after cure of from about 1 to 10 mils, usually about 2 to 4 mils. Other standard methods for coating application can be employed such as brushing, dipping or flowing.

Generally, after application of the coating composition, the coated substrate is baked at a temperature sufficient to cure the coating. Metallic substrates with powder coatings are typically cured at a temperature ranging from 230° F. to 650° F. for 30 seconds to 30 minutes.

In certain embodiments, the present coating compositions comprise comb polymers that are the reaction product of the polyol and lactone that has terminal hydroxy groups or whose terminal hydroxy groups have been converted to acid groups; the comb polymers do not have any additional moieties attached thereto. In certain embodiments the comb polymer used in the present coatings does not contain a UV curable moiety, such as (meth)acrylate.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to oligomers and both homopolymers and copolymers; the prefix "poly" refers to two or more.

EXAMPLES

The following examples are intended to illustrate the invention, and should not be construed as limiting the invention in anyway.

Example 1

An acrylic polymer grafted with caprolactone-based chains modified with anhydride was prepared as follows:

To 325 parts by weight of a commercially available hydroxyl functional acrylic polymer (JONCRYL 587, from S. C. Johnson & Son) was added 3.25 parts by weight of stannous octoate and 1235 parts by weight of $\epsilon$-caprolactone. The resultant mixture was heated to react in a nitrogen atmosphere at a temperature of 180° C. The reaction was allowed to progress for 4 hours at that temperature. The reaction was then cooled to 120° C. and 62.6 parts by weight of hexahydrophthalic anhydride were added. The reaction was allowed to progress until no anhydride groups were detected by infrared spectroscopy analysis of the material.

The reaction product was then cooled, discharged and analyzed. The determined acid value was 17.9 mg KOH/gram, and hydroxy value was 4.9 mg KOH/gram. Analysis of the polymer by GPC (using linear polystyrene standards) showed the polymer to have an Mw value of 90,893, and an Mn value of 4308. The melting temperature was determined to be 48.5° C. by differential scanning calorimetry.

Example 2

An acrylic polymer grafted with caprolactone-based chains modified with anhydride was prepared as follows:

To 160 parts by weight of JONCRYL 587 was added 3.42 parts by weight of stannous octoate and 1520 parts by weight of $\epsilon$-caprolactone. The resultant mixture was heated to react in a nitrogen atmosphere at a temperature of 170° C. The reaction was allowed to progress for 4 hours at that temperature. The reaction was then cooled to 120° C. and 30.8 parts by weight of hexahydrophthalic anhydride were added. The reaction was allowed to progress until no anhydride groups were detected by infrared spectroscopy analysis of the material.

The reaction product was then cooled, discharged and analyzed. The determined acid value was 9.7 mg KOH/gram, and hydroxy value was 3.2 mg KOH/gram. Analysis of the polymer by GPC (using linear polystyrene standards) showed the polymer to have an Mw value of 215,933, and an Mn value of 9293. The melting temperature was determined to be 53° C. by differential scanning calorimetry.

Example 3

An acrylic polymer grafted with caprolactone-based chains was prepared as follows:

To 355 parts by weight of JONCRYL 587 was added 3.41 parts by weight of stannous octoate and 1349 parts by weight of $\epsilon$-caprolactone. The resultant mixture was heated to react in a nitrogen atmosphere at a temperature of 180° C. The reaction was allowed to progress for 4 hours at that temperature.

The reaction product was then cooled, discharged and analyzed. The determined acid value was 2.7 mg KOH/gram, and hydroxy value was 20.7 mg KOH/gram. Analysis of the polymer by GPC (using linear polystyrene standards) showed the polymer to have an Mw value of 66,489, and an Mn value of 4,877. The melting temperature was determined to be 56.3° C. by differential scanning calorimetry, and no glass transition temperature was observed.

Example 4

A polysiloxane polyol grafted with caprolactone-based chains modified with anhydride was prepared as follows:

Part 1

To a suitable reaction vessel equipped with a means for maintaining a nitrogen blanket, the following components were charged under nitrogen flow: 116 grams of 2-allyloxypropanol, 428 grams of trimethylol propane diallyl ether, 0.04 grams of sodium acetate, and a solution of chloroplatinic acid in isopropanol equivalent to 10 ppm of active platinum based on total monomer solids. The temperature of the initial charge was increased to 80° C. and 14 grams of 1,1,3,3-tetramethyldisiloxane was added. An increase in temperature was indicative of initiation of the reaction. The temperature of the reaction mixture was increased to 95° C. and the addition of 277 grams of 1,1,3,3-tetramethyldisiloxane was completed over 60 minutes. The reaction was exothermic and the temperature was controlled between 90 and 100° C. using a cool water bath. The reaction was held at 98° C. for one hour after complete addition of all reactants. The reaction was monitored by infrared spectroscopy for the disappearance of a silicon hydride absorption at 2150 cm-1. The reaction product was purified by filtration and isolated as a neat polymer with a hydroxyl number of 176 OH/gram of material.

Part 2

To 200 parts by weight of the product prepared in Part 1 was added 3.25 parts by weight of stannous octoate and 1427.2 parts by weight of $\epsilon$-caprolactone. The resultant mixture was heated to react in a nitrogen atmosphere at a temperature of 175° C. The reaction was allowed to progress for 4 hours at that temperature. The reaction was then cooled to 120° C. and 30.8 parts by weight of hexahydrophthalic anhydride were added. The reaction was allowed to progress until no anhydride groups were detected by Infrared spectroscopy analysis of the material.

The reaction product was then cooled, discharged and analyzed. The determined acid value was 17.6 mg KOH/gram, and hydroxy value was 15.8 mg KOH/gram. Analysis of the polymer by GPC (using linear polystyrene standards) showed the polymer to have an Mw value of 25,564, and an Mn value of 8961. The melting temperature was determined to be 51.3° C. by differential scanning calorimetry.

Example 5

Powder coating samples were prepared using the ingredients and amounts (in grams) shown in Table A. The samples were prepared as follows. The ingredients were weighed together and processed for ~20 s in a Prism blender at 3500 rpm's. This premix Was then extruded through a b&p Process Equipment and Systems 19 mm, co-rotating, twin screw extruder at 450 rpm's, at temperatures ranging from 100° C. to 115° C. The resultant chip was milled and classified to a median particle size of 30 to 50 μm on a Hosokawa Micron Powder Systems Air Classifying Mill I. The formulas were then electrostatically sprayed using Nordson corona equipment onto panels supplied by ACT Laboratories as B-1000 P60 DIW, nonpolished panels which were first coated in the lab with P-590 electrocoat available from PPG Industries, Inc. The powder formulations were baked for a dwell time of 25 minutes at 375° F. All testing was run at a dry film thickness of 2.5 to 3.0 mils.

TABLE A

| Material | Sample 1 | Sample 2 | Sample 3 | Sample 4 |
|---|---|---|---|---|
| CRYLCOAT 630[1] | 502.8 | 487.3 | 496.8 | 487.8 |
| Product from Example 1 | — | 30.0 | — | — |
| Product from Example 2 | — | — | 30.0 | — |
| Product from Example 4 | — | — | — | 30.0 |
| Triglycidylisocyanurate[2] | 37.8 | 37.8 | 37.8 | 37.8 |
| VESTAGON BF 1540[3] | 21.0 | 21.0 | 21.0 | 21.0 |
| ACTIRON 32-057[4] | 1.4 | 1.4 | 1.4 | 1.4 |
| Benzoin | 5.6 | 5.6 | 5.6 | 5.6 |
| RESIFLOW PL-200[5] | 7.0 | 7.0 | 7.0 | 7.0 |
| LICOWAX C[6] | 2.6 | 2.6 | 2.6 | — |
| IRGANOX 1076[7] | 8.4 | 8.4 | 8.4 | 8.4 |
| TiO$_2$ R706[8] | 150.0 | 150.0 | 150.0 | 150.0 |
| Impact (direct/reverse)(in-lbs)[9] | 20/<20 | 90/160 | 40/30 | 50/30 |
| MEK (50 double rubs)[10] | 4 | 3 | 5 | 4 |

[1]Superdurable carboxylic acid functional polyester from UCB Surface Specialties.
[2]Available from Vantico Inc.
[3]Self-blocked isophorone diisocyanate from Degussa CRM.
[4]Dimethyl lauryl amine on silica support, from Synthron Inc.
[5]Acrylic flow additive dispersed on silica, from Estron Chemical.
[6]Ethylene bis(stearamide), from Clariant Additives.
[7]Antioxidant, from CIBA Additives.
[8]Available from DuPont.
[9]Impact testing was run according to ASTM D 2794 using a Byk-Gardner Falling Dart Impact tester.
[10]MEK resistance was run by rubbing a Q-tip soaked with methyl ethyl ketone back and forth across a panel (one double rub) 50 times and then rating the resulting marks as follows: MEK rating system:
0 No change
1 Slight gloss loss around test area
2 Barely detectable gloss loss in test area
3 Barely detectable scuffing of test area
4 Slightly detectible scuffing of test area
5 Noticeable scuffing of test area
6 Marring of test area
7 Smearing of test area
Readings of 0–5 are generally regarded as acceptable.

Table A demonstrates that coatings prepared with the additives of the present invention gave better impact resistance and comparable if not better solvent resistance as compared with a control sample.

Whereas particular embodiments of this invention have been described above for purposes of illustration, it will be evident to those skilled in the art that numerous variations of the details of the present invention may be made without departing from the invention as defined in the appended claims.

What is claimed is:

1. A curable powder coating composition comprising:
   (a) a compound that comprises the reaction product of a polyol having at least one hydroxyl group and a lactone, wherein the polyol comprises an acrylic polyol;
   (b) a film-forming resin; and
   (c) a crosslinker.

2. The composition of claim 1, wherein the acrylic polyol has a weight average molecular weight of 500 to 200,000.

3. The composition of claim 2, wherein the acrylic polyol has a weight average molecular weight of 12,000 to 50,000.

4. The composition of claim 1, wherein 1 to 100 percent of the hydroxyl functional groups on the acrylic polyol have a lactone grafted thereto.

5. The composition of claim 4, wherein greater than 90 percent of the hydroxyl functional groups on the acrylic polyol have a lactone grafted thereto.

6. The composition of claim 1, wherein the reaction product of the acrylic polyol and the lactone has a weight average molecular weight of 1,000 to 500,000.

7. The composition of claim 6, wherein the reaction product of the acrylic polyol and the lactone has a weight average molecular weight of 25,000 to 250,000.

8. The composition of claim 1, wherein the lactone comprises epsilon-caprolactone.

9. The composition of claim 1, wherein the reaction product of the acrylic polyol and the lactone comprises lactone chains comprising 1 to 50 lactone derived units.

10. The composition of claim 1, wherein the film-forming resin is hydroxy functional.

11. The composition of claim 10, wherein the film-forming resin comprises polyester.

12. The composition of claim 1, wherein the film-forming resin is present in an amount of 50 weight percent or greater, based on total weight of the composition.

13. The composition of claim 12, wherein the reaction product of the acrylic polyol and the lactone is present in an amount of 0.1 to 20 weight percent.

14. The composition of claim 13, wherein the reaction product of the acrylic polyol and the lactone is present in an amount of 0.1 to less than 10 weight percent.

15. The compound of claim 1, wherein the acrylic polyol comprises hydroxyethyl methacrylate, methyl methacrylate, and/or ethyl acrylate.

* * * * *